(12) United States Patent
Chen et al.

(10) Patent No.: US 12,115,700 B2
(45) Date of Patent: Oct. 15, 2024

(54) DRYING OVEN FOR THREE-DIMENSIONAL (3D) PRINTING MATERIALS

(71) Applicant: Shenzhen EIBOS Chuanggou Tech Co., Ltd, Guangdong (CN)

(72) Inventors: Dezhen Chen, Guangdong (CN); Yubo Shen, Guangdong (CN); Yi Yu, Guangdong (CN); Yueyi Yu, Guangdong (CN)

(73) Assignee: Shenzhen EIBOS Chuanggou Tech Co., Ltd, Shenzhen (CN)

( * ) Notice: Subject to any disclaimer, the term of this patent is extended or adjusted under 35 U.S.C. 154(b) by 637 days.

(21) Appl. No.: 17/373,563

(22) Filed: Jul. 12, 2021

(65) Prior Publication Data
US 2021/0339430 A1 Nov. 4, 2021

(30) Foreign Application Priority Data
Aug. 20, 2020 (CN) .......................... 202021751854.0

(51) Int. Cl.
*B29B 13/06* (2006.01)
*B33Y 40/10* (2020.01)

(52) U.S. Cl.
CPC .............. *B29B 13/06* (2013.01); *B33Y 40/10* (2020.01)

(58) Field of Classification Search
CPC ................................ B29B 13/06; B29B 40/10
USPC ......................................................... 34/236
See application file for complete search history.

(56) References Cited

U.S. PATENT DOCUMENTS

| 3,143,336 A * | 8/1964 | Byberg ............... B01F 27/9211 366/156.1 |
| 3,755,918 A * | 9/1973 | Parrot .................... B65G 69/00 34/236 |
| 3,775,542 A * | 11/1973 | Salbego .................. A23L 11/07 426/459 |
| 4,467,534 A * | 8/1984 | Murase .................. D06F 58/02 34/140 |
| 4,824,312 A * | 4/1989 | Schiltz ................. B65G 65/466 414/326 |
| 5,557,859 A * | 9/1996 | Baron ................... F26B 21/083 34/512 |
| 5,651,193 A * | 7/1997 | Rhodes ................. F26B 25/009 34/535 |
| 6,012,306 A * | 1/2000 | Raes ....................... D06F 25/00 68/19.2 |

(Continued)

FOREIGN PATENT DOCUMENTS

| CN | 108613480 A | 10/2018 | |
| CN | 111023735 A | 4/2020 | |
| CN | 212747141 U * | 3/2021 | ............. B29B 13/06 |

*Primary Examiner* — Stephen M Gravini

(57) ABSTRACT

A drying oven for 3D printing materials includes a base, an upper cover, a rotating shaft assembly and a drying assembly. The drying assembly includes a heating plate and a fan. An air outlet end of the fan faces upward, and the heating plate is arranged above the air outlet end of the fan. An accommodating cavity is provided at a middle of the base, and an air inlet communicating with outside is provided at a bottom of the accommodating cavity. The fan and the heating plate are arranged in the accommodating cavity. The rotating shaft assembly is arranged on a top surface of the base. An air outlet is arranged at an upper end of the upper cover, and the upper cover is configured to cover the base.

6 Claims, 3 Drawing Sheets

(56) References Cited

U.S. PATENT DOCUMENTS

| | | | | |
|---|---|---|---|---|
| 6,729,196 B2* | 5/2004 | Moler | ................ | B01D 45/08 |
| | | | | 73/863.22 |
| 7,568,297 B2* | 8/2009 | Pierson | ................ | F26B 9/103 |
| | | | | 34/174 |
| 11,679,526 B2* | 6/2023 | Zhou | ................ | F26B 3/04 |
| | | | | 432/18 |
| 2021/0339430 A1* | 11/2021 | Chen | ................ | B29C 64/314 |
| 2024/0027134 A1* | 1/2024 | Hua | ................ | F27B 17/0016 |

\* cited by examiner

DRYING OVEN FOR THREE-DIMENSIONAL (3D) PRINTING MATERIALS

CROSS-REFERENCE TO RELATED APPLICATIONS

This application claims the benefit of priority from Chinese Patent Application No. 202021751854.0, filed on Aug. 20, 2020. The content of the aforementioned application, including any intervening amendments thereto, is incorporated herein by reference in its entirety.

TECHNICAL FIELD

This application relates to three-dimensional (3D) printing devices, and more particularly to a drying oven for 3D printing materials.

BACKGROUND

Currently, fused deposition modeling (FDM) is the most popular three-dimensional (3D) printing process, in which the commonly-used consumables are polymer thermoplastic materials. Generally, the polymer thermoplastic materials are wound on a reel in a form of filament. In the practical use, the reel is directly exposed to the air, and at this time, the polymeric thermoplastic materials thereon are easy to absorb moisture, resulting in an increase of moisture content. During the 3D printing process, the consumables will be heated, and the water adsorbed inside will be boiled to form bubbles in the polymer thermoplastic materials, which will directly affect the appearance and strength of the modeling, and even directly reduce the molecular weight of the polymer thermoplastic material and their mechanical properties.

At present, there are mainly two technical methods for solving the moisture absorption of consumables. One method is to place the consumables in a closed space, in which a desiccant is provided to lower the ambient humidity to reduce the moisture absorption degree of the material. This method is merely suitable for the temporary storage of the material, and cannot essentially remove but the water inside the material. The other method is to heat the consumables in an oven before use to evaporate the inside moisture to achieve the drying effect. However, this method has a slow drying rate and the treated consumables cannot be used directly.

SUMMARY

An object of this application is to provide a drying oven for 3D printing materials to solve the problem in the prior art that the consumables are prone to moisture absorption during use, leading to poor appearance and strength of 3D printed products.

The technical solutions of this application are described as follows.

This application provides a drying oven for 3D printing materials, comprising:
a base;
an upper cover;
a rotating shaft assembly; and
a drying assembly;
wherein the drying assembly comprises a heating plate and a fan; an air outlet end of the fan faces upward, and the heating plate is arranged above the air outlet end of the fan; and
an accommodating cavity is provided at a middle of the base, and a bottom of the accommodating cavity is provided with an air inlet communicating with outside; the fan and the heating plate are arranged in the accommodating cavity; the rotating shaft assembly is arranged on a top surface of the base; an air outlet is arranged at an upper end of the upper cover; and the upper cover is configured to cover the base.

In some embodiments, the rotating shaft assembly comprises a front rotating shaft base, a front rotating shaft, a rear rotating shaft base and a rear rotating shaft;
the front rotating shaft base is arranged on a front side of the accommodating cavity, and both ends of the front rotating shaft are rotatably connected to the front rotating shaft base, respectively; and
the rear rotating shaft base is arranged on a rear side of the accommodating cavity, and both ends of the rear rotating shaft are rotatably connected to the rear rotating shaft base, respectively.

In some embodiments, the front rotating shaft base comprises a first support, a second support and a third support; the first support is arranged on one end of a front portion of the base; the second support is arranged on the other end of the front portion of the base; and the third support is arranged between the first support and the second support;
top ends of the first support, the second support and the third support are provided with a first concave cavity, a second concave cavity and a third concave cavity, respectively; a thickness of the third support is greater than that of the first support or the second support; a height of a rear side of the first support, the second support and the third support is smaller than that of a front side of the first support, the second support and the third support; and
the front rotating shaft comprises a first front rotating shaft and a second front rotating shaft; the first front rotating shaft is rotatably connected with the first support and the third support through the first concave cavity and the third concave cavity, respectively; and the second front rotating shaft is rotatably connected with the second support and the third support through the second concave cavity and the third concave cavity, respectively.

In some embodiments, the rear rotating shaft base comprises a fourth support, a fifth support and a sixth support; the fourth support is arranged on one end of a rear portion of the base; the fifth support is arranged on the other end of the rear portion of the base; and the sixth support is arranged between the fourth support and the fifth support;
top ends of the fourth support, the fifth support and the sixth support are provided with a fourth concave cavity, a fifth concave cavity and a sixth concave cavity, respectively; a thickness of the sixth support is greater than that of the fourth support or the fifth support; a height of a front side of the fourth support, the fifth support and the sixth support is smaller than that of a rear side of the fourth support, the fifth support and the sixth support; and
the rear rotating shaft comprises a first rear rotating shaft and a second rear rotating shaft; the first rear rotating shaft is rotatably connected with the fourth support and the sixth support through the fourth concave cavity and the sixth concave cavity, respectively; and the second rear rotating shaft is rotatably connected with the fifth support and the sixth support through the fifth concave cavity and the sixth concave cavity.

In some embodiments, the upper cover is provided with a hygrometer, and a detection end of the hygrometer extends into the upper cover.

In some embodiments, a spoiler is provided at an opening of the accommodating cavity, and the spoiler is provided with a plurality of inclined surfaces; and the plurality of inclined surfaces comprises forward-inclined surfaces, backward-inclined surfaces, leftward-inclined surfaces and rightward-inclined surfaces.

In some embodiments, the upper end of the upper cover is provided with a plurality of discharge ports and backup discharge ports;

the plurality of discharge ports are arranged spaced apart on a proximal front end of a top of the upper cover, and the plurality of backup discharge ports are arranged spaced apart on a proximal rear end of the top of the upper cover; and a plurality of guiding pipes are provided at the plurality of discharge ports, respectively, and the plurality of guiding pipes are insertedly connected with the plurality of discharge ports, respectively.

In some embodiments, a plurality of pads are provided at a lower end of the base; one end of each of the plurality of pads is connected to the lower end of the base, and the other end of each of the plurality of pads is in contact with a surface where the base is placed.

This application has the following beneficial effects.

In this application, hot air is formed under the action of the fan and the heating plate, and then fed into the cavity sealed with the upper cover. The hot air flow heats the consumable in the cavity to evaporate the water inside. Due to the low density, the hot air will carry the water vapor to rise to be finally discharged from the air outlet. The drying oven provided herein for 3D printing materials can effectively remove the water adsorbed inside the consumables, and the cavity sealed with the upper cover can be kept dry to prevent the consumables from absorbing moisture again.

BRIEF DESCRIPTION OF THE DRAWINGS

The disclosure will be further described below with reference to the accompanying drawings. It should be understood that these drawings are merely illustrative of the disclosure, and are not intended to limit the scope of the present disclosure.

Figure 1:
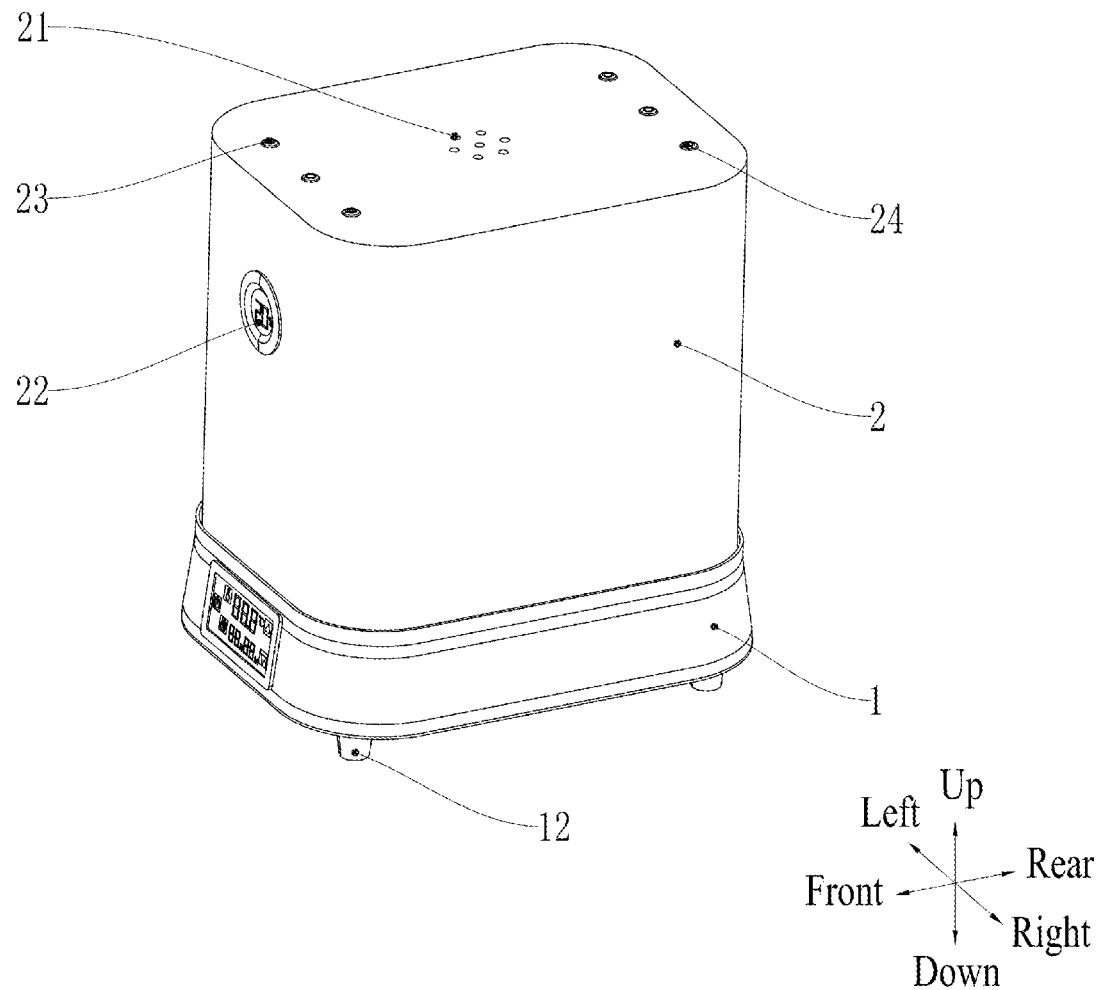
FIG. 1 is a schematic diagram of a drying oven from 3D printing materials according to an embodiment of the disclosure.

In the drawings, 1, base; 2, upper cover; 3, drying assembly; 4, rotating shaft assembly; 5, reel; 11, accommodating cavity; 12, pad; 21, air outlet; 22, hygrometer; 23, discharge port; 24, backup discharge port; 31, heating plate; 32, fan; 41, front rotating shaft base; 42, front rotating shaft; 43, rear rotating shaft base; 44, rear rotating shaft; 111, air inlet; 112, spoiler; 231, guiding pipe; 411, first support; 412, second support; 413, third support; a1, first concave cavity; a2, second concave cavity; a3, third concave cavity; 421, first front rotating shaft; 422 second front rotating shaft; 431, fourth support; 432, fifth support; 433, sixth support; b1, fourth concave cavity; b2, fifth concave cavity; b3, sixth concave cavity; 441, first rear rotating shaft; and 442 second rear rotating shaft.

DETAILED DESCRIPTION OF EMBODIMENTS

The technical solutions of the disclosure will be further described below in detail with reference to the accompanying drawings and the embodiments. It should be noted that all directional indications (such as up, down, front, rear, left, right, inner, etc.) used herein are only used to describe the relative position relationship shown in the drawings to simplify the description, rather than indicating or implying that the device or element referred to must have a specific orientation, or be constructed and operated in a specific orientation. Thus, it cannot be understood as a limitation of the disclosure.

It should be noted that the relative terms such as "first", "second", "third" and "fourth" are only used for description, and cannot be understood as indicating or implying their relative importance or implicitly indicating the number of technical features referred to. Thus, features defined by "first", "second", "third" and "fourth" may explicitly or implicitly include one or more of these features. Moreover, finless otherwise specified, the term "a plurality of" used herein means at least two.

This application provides a drying oven for 3D printing materials, which includes a base 1, an upper cover 2, a rotating shaft assembly 4 and a drying assembly 3.

The drying assembly 3 includes a heating plate 31 and a fan 32. An air outlet end of the fan 32 faces upward, and the heating plate 31 is arranged above the air outlet end of the fan 32.

An accommodating cavity 11 is provided at a middle of the base 1, and a bottom of the accommodating cavity 11 is provided with an air inlet 111 communicating with outside. The fan 32 and the heating plate 31 are arranged in the accommodating cavity 11. The rotating shaft assembly 4 is arranged on a top surface of the base 1. An air outlet 21 is arranged at an upper end of the upper cover 2. The upper cover 2 is configured to cover the base 1.

The reel 5 wound with consumables is placed on the rotating shaft assembly 4. The upper cover 2 is covered on the base 1, and a sealing cavity is formed between the upper cover 2 and the base 1. The reel 5 is arranged in the sealing cavity. When the drying oven for 3D printing materials is started, the fan 32 sucks air through the air inlet 111 at the bottom of the containing cavity 11. Since the air outlet end of the fan 32 is arranged below the heating plate 31, the fan 32 sends the airflow to the heating plate 31. The air flows flow through the heating plate 31 and is heated by the heating plate 31 to form a hot air. The hot air enters the sealing cavity through the opening of the containing cavity 11, and heats the water inside the consumables wound on the reel 5 to evaporate. The upper end of the upper cover 2 is provided with an air outlet 21, and the hot air flow carries water to be discharged from the air outlet 21, achieving rapid drying.

In this application, hot air is formed by the fan 32 and the heating plate 31, and then input into the sealing cavity. The consumable is heated by the hot air flow to evaporate the water into water vapor. The hot air carries the water vapor upwards due to the density of the hot air is low, and the water vapor is finally discharged from the air outlet 21. The drying oven for 3D printing material can effectively remove the water adsorbed inside the consumables, and the sealing cavity in the upper cover keeps dry to prevent the consumables from absorbing moisture again.

In some embodiments, the rotating shaft assembly 4 includes a front rotating shaft base 41, a front rotating shaft 42, a rear rotating shaft base 43 and a rear rotating shaft 44.

The front rotating shaft base 41 is arranged on a front side of the accommodating cavity 11, and both ends of the front rotating shaft 42 are rotatably connected to the front rotating shaft base 41, respectively.

The rear rotating shaft base 43 is arranged on a rear side of the accommodating cavity 11, and both ends of the rear rotating shaft 44 are rotatably connected to the rear rotating shaft base 43, respectively.

The reel 5 is arranged between the front rotating shaft 42 and the rear rotating shaft 44. Since the front rotating shaft 42 is rotatably connected to the front rotating shaft base 41 and the rear rotating shaft 44 is rotatably connected to the rear rotating shaft base 43, the reel 5 can rotate around its own axis. The accommodating cavity 11 is arranged between the front rotating shaft 42 and the rear rotating shaft 44. Therefore, the hot air will directly contact with the consumables after entering the sealing cavity, which can effectively heat the consumables and improve the drying effect.

In some embodiments, the front rotating shaft base 41 includes a first support 411, a second support 412 and a third support 413. The first support 411 is arranged on one end of a front portion of the base 1, and the second support 412 is arranged on the other end of the front portion of the base 1. The third support 413 is arranged between the first support 411 and the second support 412.

Top ends of the first support 411, the second support 412 and the third support 413 are provided with a first concave cavity a1, a second concave cavity a2 and a third concave cavity a3, respectively. A thickness of the third support 413 is greater than that of the first support 411 or the second support 412. A height of a rear side of the first support 411, the second support 412 and the third support 413 is smaller than that of a front side of the first support 411, the second support 412 and the third support 413.

The front rotating shaft 42 includes a first front rotating shaft 421 and a second front rotating shaft 422. The first front rotating shaft 421 is rotatably connected with the first support 411 and the third support 413 through the first concave cavity a1 and the third concave cavity a3, respectively. The second front rotating shaft 422 is rotatably connected with the second support 412 and the third support 413 through the second concave cavity a2 and the third concave cavity a3, respectively.

In some embodiments, the rear rotating shaft base 43 includes a fourth support 431, a fifth support 432 and a sixth support 433. The fourth support 431 is arranged on one end of a rear portion of the base 1, and the fifth support 432 is arranged on the other end of the rear portion of the base 1. The sixth support 433 is arranged between the fourth support 431 and the fifth support 432.

Top ends of the fourth support 431, the fifth support 432 and the sixth support 433 are provided with a fourth concave cavity b1, a fifth concave cavity b2 and a sixth concave cavity b3, respectively. A thickness of the sixth support 433 is greater than that of the fourth support 431 or the fifth support 432. A height of a front side of the fourth support 431, the fifth support 432 and the sixth support 433 is smaller than that of a rear side of the fourth support 431, the fifth support 432 and the sixth support 433.

The rear rotating shaft 44 includes a first rear rotating shaft 441 and a second rear rotating shaft 442. The first rear rotating shaft 441 is rotatably connected with the fourth support 431 and the sixth support 433 through the fourth concave cavities b1 and the sixth concave cavity b3, respectively. The second rear rotating shaft 442 is rotatably connected with the fifth support 432 and the sixth support 433 through the fifth concave cavity b2 and the sixth concave cavity b3.

In some embodiments, the front rotating shaft base 41 and the rear rotating shaft base 43 are mirror-symmetrical by taking a central axis of the base 1 in a left-right direction as the axis. The front rotating shaft base 41 is provided with the first support 411, the second support 412 and the third support 413, and the rear rotating shaft base 43 is provided with the fourth support 431, the fifth support 432 and the sixth support 433. A reel 5 can be placed through a cooperation of the first support 411, the third support 413, the fourth support 431 and the sixth support 433. The other reel 5 can also be placed through a cooperation of the second support 412, the third support 413, the fifth support 432 and the sixth support 433. The two reels 5 will not affect each other, and can be dried at the same time to improve the drying efficiency.

The height of ends of the first support 411, the second support 412 and the third support 413 near the accommodating cavity 11 is lower than that of ends of the first support 411, the second support 412 and the third support 413 away from the accommodating cavity 11. The height of ends of the fourth support 431, the fifth support 432 and the sixth support 433 near the accommodating cavity 11 is lower than that of ends of the fourth support 431, the fifth support 432 and the sixth support 433 away from the accommodating cavity 11. It can enhance the stability of the reel 5 during the rotation process, and avoid the problem that the reel 5 rotates too fast and comes out of the front rotating shaft base 41 or the rear rotating shaft base 43, causing damage to the interior of the drying oven for 3D printing material.

In some embodiments, the upper cover 2 is provided with a hygrometer 22, and a detection end of the hygrometer 22 extends into the upper cover 2. The hygrometer 22 is arranged on the front side of the upper cover 2, so that the user can obtain the humidity value inside the drying oven for 3D printing material in real time. In addition, the temperature of the heating plate 31 and the rotation speed of the fan 32 can be adjusted to avoid the thermoplastic polymer wound on the reel 5 from adsorbing water and affecting the printing effect of the product.

In some embodiments, a spoiler 112 is provided at an opening of the accommodating cavity 11, and the spoiler 112 is provided with a plurality of inclined surfaces. The inclined surfaces include forward-inclined surfaces, backward-inclined surfaces, leftward-inclined surfaces and rightward-inclined surfaces.

The spoiler 112 plays a role of guiding hot air, and guides the hot air generated by the drying assembly 3 to all directions inside the drying oven for 3D printing material, which can fully increase the temperature in the drying oven for 3D printing material, so that the all parts of the consumables can be heated uniformly. It prevents the hot air directly discharged through the air outlet 21 after being generated from the drying assembly 3, and avoids that the drying oven for 3D printing material cannot be fully heated, resulting in uneven heating of consumables and poor drying effect.

In some embodiments, the upper end of the upper cover 2 is provided with a plurality of discharge ports 23 and backup discharge ports 24.

Figure 2:
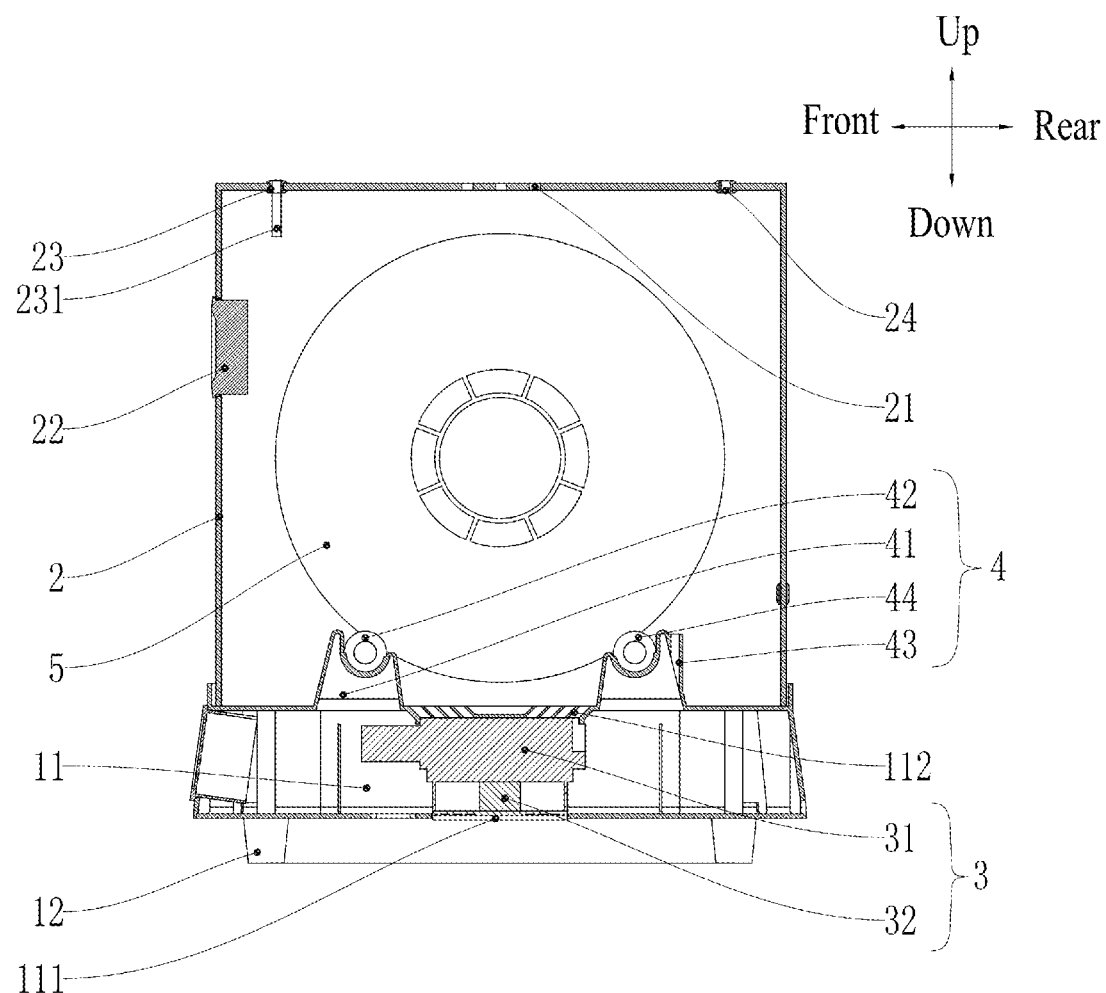
FIG. 2 is a sectional view of the drying oven according to an embodiment of the disclosure.
Figure 3:
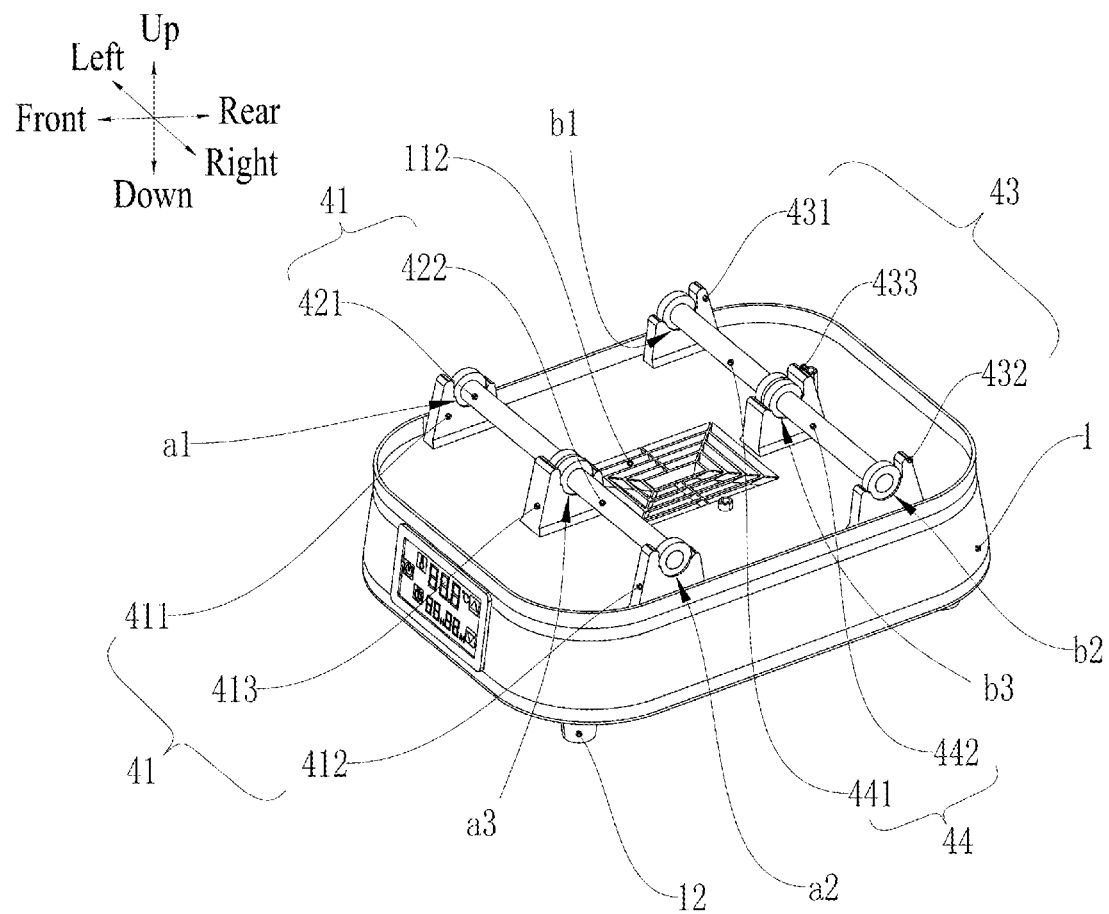
FIG. 3 is a schematic diagram of a base according to an embodiment of the disclosure.

The plurality of discharge ports 23 are arranged spaced apart on a proximal front end of a top of the upper cover 2, and the plurality of backup discharge ports 24 are arranged spaced apart on a proximal rear end of the top of the upper cover 2. A plurality of guiding pipes 231 are provided at the plurality of discharge ports 23, respectively, and the plurality of guiding pipes 231 are insertedly connected with the plurality of discharge ports 23, respectively. Referring to FIG. 2, since the front rotating shaft 42 is rotatably connected to the front rotating shaft base 41 and the rear rotating shaft 44 is rotatably connected to the rear rotating shaft base 43, the reel 5 receives upward pulling force and rotates clockwise around its axis when the consumables are extracted from the outside through the discharge port 23.

In an embodiment, referring to FIG. 1, the front side of the upper end of the upper cover 2 is provided with two discharge ports 23 and one backup discharge port 24. The backup discharge port 24 is arranged between the two discharge ports 23. The rear side of the upper end of the upper cover 2 is provided with three backup discharge ports 24. The user can use the discharge port 23 or the backup discharge port 24 at the corresponding position according to the actual discharging direction. The discharge port 23 and the backup discharge port 24 have a same structure, while a guiding pipe 231 is inserted into the discharge port 23. When the backup discharge port 24 is used, the guiding pipe 231 inserted in the discharge port 23 needs to be pulled out and inserted into the corresponding backup discharge port 24.

The guiding pipe 231 is made of Teflon. Teflon is also called polytetrafluoroethylene, which has a great friction coefficient and excellent wear resistance. The extraction of consumables through the guiding pipe 231 made of Teflon can effectively avoid the problem of jamming due to the rough surface of the discharge port 23 when the polymer thermoplastic material is extracted.

In some embodiments, a plurality of pads 12 are provided at a lower end of the base 1. One end of each of the plurality of pads 12 is connected to the lower end of the base 1, and the other end of each of the plurality of pads 12 is in contact with a surface where the base is placed. The pad 12 can increase the height of the base 1, and at the same time extend the distance between the air outlet 21 and the placing surface. The increased distance between the air outlet 21 and the placing surface can increase the amount of air entering the fan 32, so as to increase the rotation speed of the fan 32, thereby increasing the exhaust volume of the fan 32.

The above are only the preferred embodiments of the present disclosure, and are not intended to limit the scope of the present disclosure. Any changes, modifications and improvements made by those skilled in the art without departing from the spirit of the present disclosure shall fall within the scope of the present disclosure defined by the appended claims.

What is claimed is:

1. A drying oven for three-dimensional (3D) printing materials, comprising:
a base;
an upper cover;
a rotating shaft assembly; and
a drying assembly;
wherein the drying assembly comprises a heating plate and a fan; an air outlet end of the fan faces upward, and the heating plate is arranged above the air outlet end of the fan; and
an accommodating cavity is provided at a middle of the base, and a bottom of the accommodating cavity is provided with an air inlet communicating with outside; the fan and the heating plate are arranged in the accommodating cavity; the rotating shaft assembly is arranged on a top surface of the base; an air outlet is arranged at an upper end of the upper cover; and the upper cover is configured to cover the base;
the rotating shaft assembly comprises a front rotating shaft base, a front rotating shaft, a rear rotating shaft base and a rear rotating shaft;
the front rotating shaft base is arranged on a front side of the accommodating cavity, and both ends of the front rotating shaft are rotatably connected to the front rotating shaft base, respectively; and
the rear rotating shaft base is arranged on a rear side of the accommodating cavity, and both ends of the rear rotating shaft are rotatably connected to the rear rotating shaft base, respectively;
the front rotating shaft base comprises a first support, a second support and a third support; the first support is arranged at one end of a front portion of the base; the second support is arranged at an other end of the front portion of the base; and the third support is arranged between the first support and the second support;
top ends of the first support, the second support and the third support are provided with a first concave cavity, a second concave cavity and a third concave cavity, respectively; a thickness of the third support is greater than that of the first support or the second support; a height of a rear side of the first support, the second support and the third support is smaller than that of a front side of the first support, the second support and the third support; and
the front rotating shaft comprises a first front rotating shaft and a second front rotating shaft; the first front rotating shaft is rotatably connected with the first support and the third support through the first concave cavity and the third concave cavity, respective; and the second front rotating shaft is rotatably connected with the second support and the third support through the second concave cavity and the third concave cavity, respectively.

2. A drying oven for 3D printing materials, comprising:
a base;
an upper cover;
a rotating shaft assembly; and
a drying assembly;
wherein the drying assembly comprises a heating plate and a fan; an air outlet end of the fan faces upward, and the heating plate is arranged above the air outlet end of the fan; and
an accommodating cavity is provided at a middle of the base, and a bottom of the accommodating cavity is provided with an air inlet communicating with outside; the fan and the heating plate are arranged in the accommodating cavity; the rotating shaft assembly is arranged on a top surface of the base; an air outlet is arranged at an upper end of the upper cover; and the upper cover is configured to cover the base;
the rotating shaft assembly comprises a front rotating shaft base, a front rotating shaft, a rear rotating shaft base and a rear rotating shaft;
the front rotating shaft base is arranged on a front side of the accommodating cavity, and both ends of the front rotating shaft are rotatably connected to the front rotating shaft base, respectively; and
the rear rotating shaft base is arranged on a rear side of the accommodating cavity, and both ends of the rear rotating shaft are rotatably connected to the rear rotating shaft base, respectively;
wherein the rear rotating shaft base comprises a fourth support, a fifth support and a sixth support; the fourth support is arranged at one end of a rear portion of the base; the fifth support is arranged at an other end of the rear portion of the base; and the sixth support is arranged between the fourth support and the fifth support;

top ends of the fourth support, the fifth support and the sixth support are provided with a fourth concave cavity, a fifth concave cavity and a sixth concave cavity, respectively; a thickness of the sixth support is greater than that of the fourth support or the fifth support; and a height of a front side of the fourth support, the fifth support and the sixth support is smaller than that of a rear side of the fourth support, the fifth support and the sixth support; and the rear rotating shaft comprises a first rear rotating shaft and a second rear rotating shaft; the first rear rotating shaft is rotatably connected with the fourth support and the sixth support through the fourth concave cavity and the sixth concave cavity, respective; and the second rear rotating shaft is rotatably connected with the fifth support and the sixth support through the fifth concave cavity and the sixth concave cavity.

3. The drying oven of claim 1, wherein the upper cover is provided with a hygrometer, and a detection end of the hygrometer extends into the upper cover.

4. The drying oven of claim 1, wherein a spoiler is provided at an opening of the accommodating cavity, and the spoiler is provided with a plurality of inclined surfaces; and the plurality of inclined surfaces comprises forward-inclined surfaces, backward-inclined surfaces, leftward-inclined surfaces and rightward-inclined surfaces.

5. The drying oven of claim 1, wherein the upper end of the upper cover is provided with a plurality of discharge ports and backup discharge ports;

the plurality of discharge ports are arranged spaced apart on a proximal front end of a top of the upper cover, and the plurality of backup discharge ports are arranged spaced apart on a proximal rear end of the top of the upper cover; and a plurality of guiding pipes are provided at the plurality of discharge ports, respectively; and the plurality of guiding pipes are insertedly connected with the plurality of discharge ports, respectively.

6. The drying oven of claim 1, wherein a plurality of pads are provided at a lower end of the base; one end of each of the plurality of pads is connected to the lower end of the base, and an other end of each of the plurality of pads is in contact with a surface where the base is placed.

* * * * *